Figure 1:
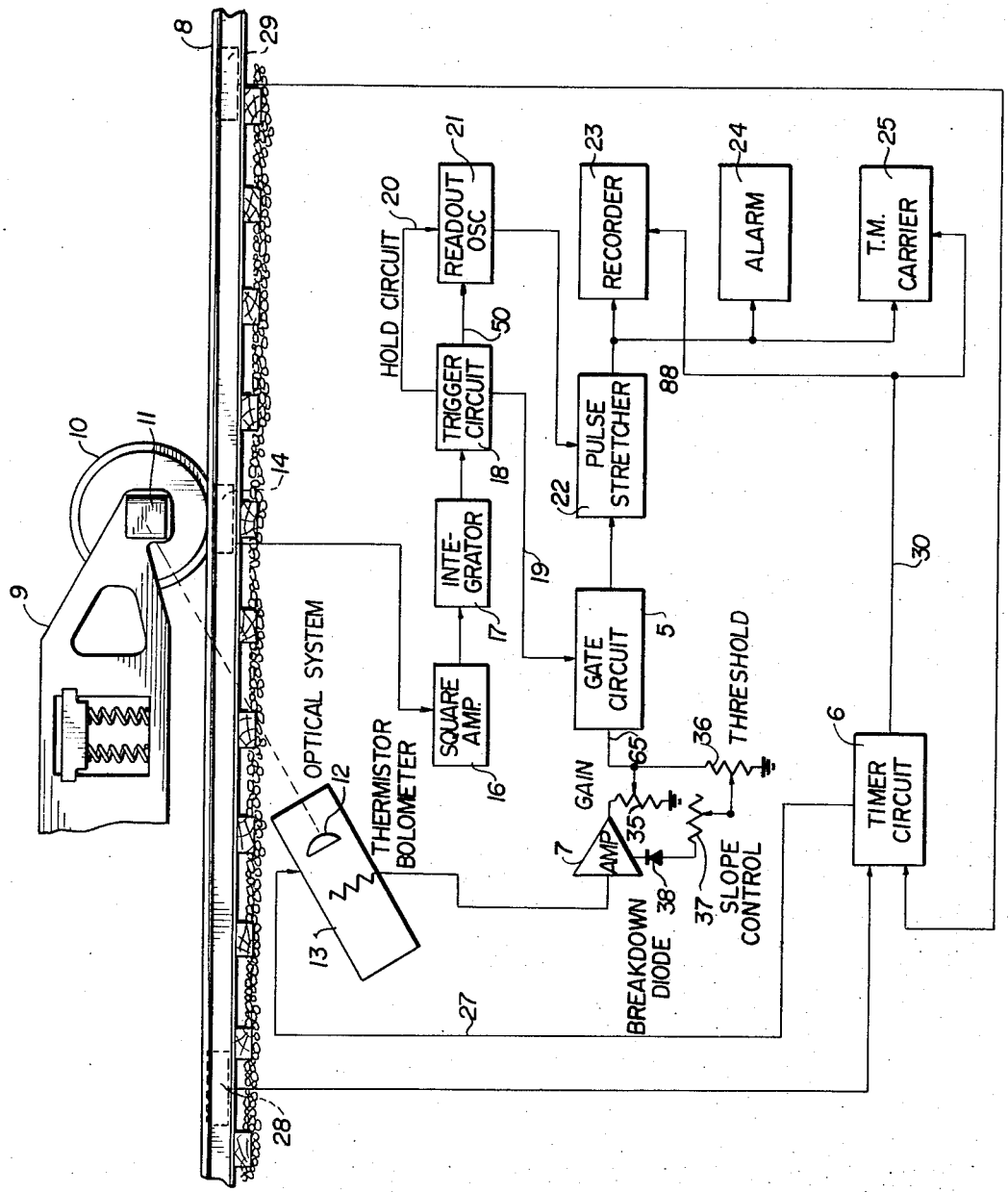

United States Patent

Howell

[15] 3,697,744
[45] Oct. 10, 1972

[54] HOT BOX DETECTOR OPERABLE WITH DIVERSE TYPE BEARING ASSEMBLIES

[72] Inventor: Roland A. Howell, 3814 Woodbrook Drive, Chattanooga, Tenn. 37407

[22] Filed: April 29, 1970

[21] Appl. No.: 32,909

[52] U.S. Cl. ................................................246/169 D
[51] Int. Cl. ..............................B61k 9/06, B611 3/06
[58] Field of Search..........................246/169 D, 249

[56] References Cited

UNITED STATES PATENTS

| | | | |
|---|---|---|---|
| 3,539,810 | 11/1970 | Pettitt et al. | 246/169 D X |
| 3,461,284 | 8/1969 | Joy | 246/169 D |
| 3,086,108 | 4/1963 | Kaehms | 246/169 D |
| 3,263,090 | 7/1966 | Blocher | 246/169 D X |
| 2,973,430 | 2/1961 | Pelino | 246/249 |
| 3,100,097 | 8/1963 | Woltersdorf | 246/169 D |
| 3,440,416 | 4/1969 | Pelino | 246/169 D |
| 3,169,735 | 2/1965 | Sinclair | 246/169 D |

*Primary Examiner*—Gerald M. Forlenza
*Assistant Examiner*—George H. Libman
*Attorney*—Laurence R. Brown

[57] ABSTRACT

An electronic hot box detector provides for giving alarm signals in response to overheated bearings of moving railroad cars. Special electronic control circuits avoid either errors of omission of a reading when a bearing heated above a predetermined temperature is presented or false alarms from other heated bodies in the train. Nevertheless, the detector senses overheated bearings of different types that present diverse temperature ranges. Thus precisely controlled electronic gates are used to sense thermal samples which are processed through amplifier circuits providing non-linear amplification characteristics to establish a readable range encompassing the desired thermal variations of both roller bearing and friction bearing assemblies.

7 Claims, 7 Drawing Figures

INVENTOR
ROLAND A. HOWELL

BY  Laurence R. Brown

ATTORNEY

PATENTED OCT 10 1972

3,697,744

SHEET 2 OF 5

INVENTOR
ROLAND A. HOWELL

BY Lawrence R. Brown

ATTORNEY

INVENTOR
ROLAND A. HOWELL

BY Lawrence R. Brown
ATTORNEY

HOT BOX DETECTOR OPERABLE WITH DIVERSE TYPE BEARING ASSEMBLIES

This invention relates to hot box detector systems and more particularly to gated detectors that sense the temperature of bearings on moving railroad cars for a predetermined short time period.

While hot box detector systems have been in use for some time, they have presented problems because of the critical nature of the sensing. Thus, trains may be stopped unnecessarily when a bearing is not overheated of overheated bearings may be overlooked. To be most effective hot box detectors should indicate bearings slightly above normal operating temperatures so they can be serviced before failure. However if the sensing temperatures required to set off the alarm are low enough to do this in prior art systems, trains tend to be stopped unnecessarily because of the propensity to sense hot bodies in the train other than overheated bearings, such as steam pipes or brake shoes.

It has been found necessary to direct the detector to a particular limited scanning region to limit the detection more closely to the bearing assemblies without introducing as many other train elements into the detector field. Also it has been found necessary to sense the presence of each bearing assembly as it approaches the detector and to gate on the detector only during a short time interval the bearing is being moved past the detector position. This eliminates some other ones of the possible readings of erroneous signals introduced by other hot bodies at different times during the passing of the train.

However, even with these improvements, it is difficult to sense bearings on moving trains because of large differences in speed and in particular because of differences in bearing construction. Thus at the sensing position, if a detector is focussed on a unique gated spot at which the bearing assemblies pass, differences in train speeds can cause differences in detected signal response, particularly with very high speed and very low speed trains. Also, a friction bearing may normally run at a temperature range of about 20° to 25° F above ambient, whereas a roller bearing running normally may be sensed at about 75° to 100° F above ambient. This condition exists because a friction bearing is housed generally in a cast iron box which is viewed by the sensor as contrasted with the race of the bearing assembly in the case of roller bearings. Such differences in temperature of response could account for passing overheated friction bearings or conversely in stopping the train when roller bearings are too close to normal operating temperatures.

Accordingly it is a general object of the invention to provide improved hot box detector systems.

A further object of the invention is to provide improved performance of hot box detector systems in eliminating false signals that tend to be presented when bearings are sensed in a moving train.

Another object of the invention is to provide hot box detector systems that respond to indicate above normal temperatures of different types of bearing construction presented by a moving train.

Figure 2:
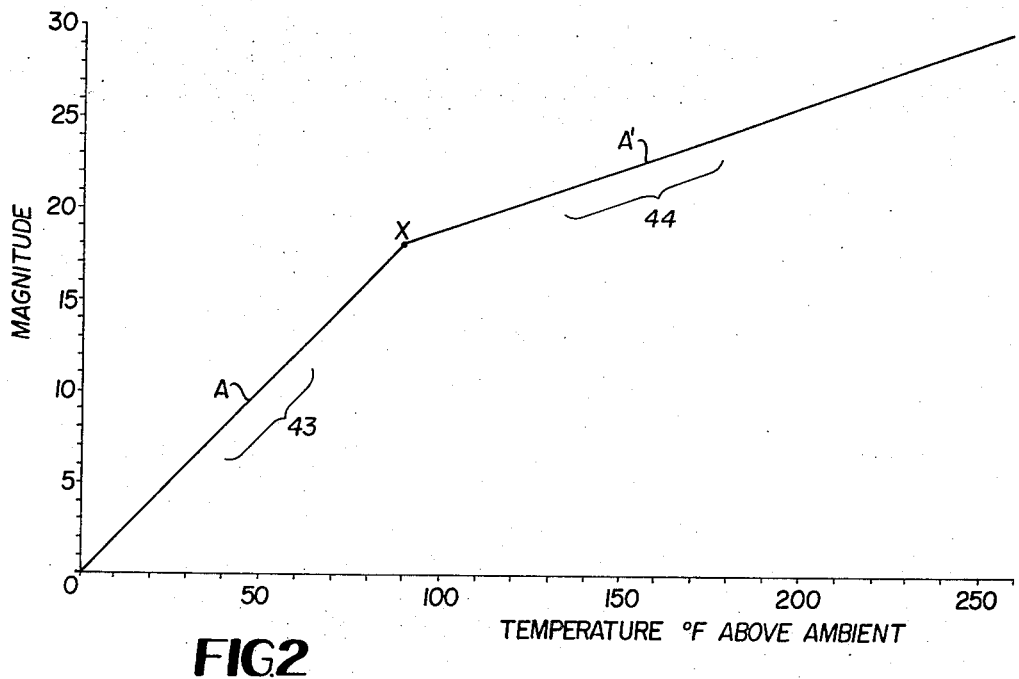
Figure 4:
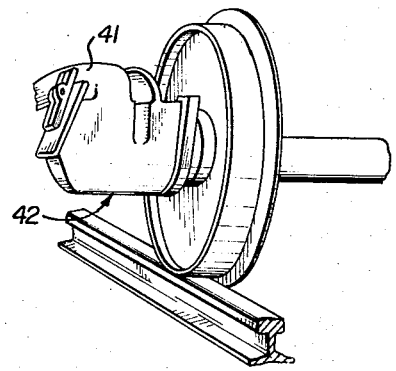
Figure 3:
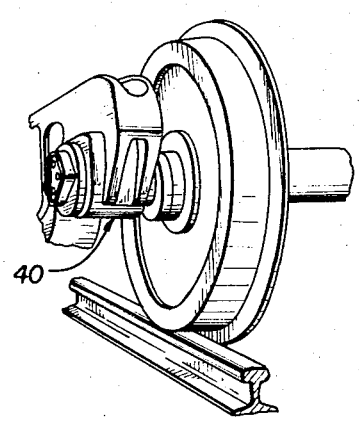
Figure 5:
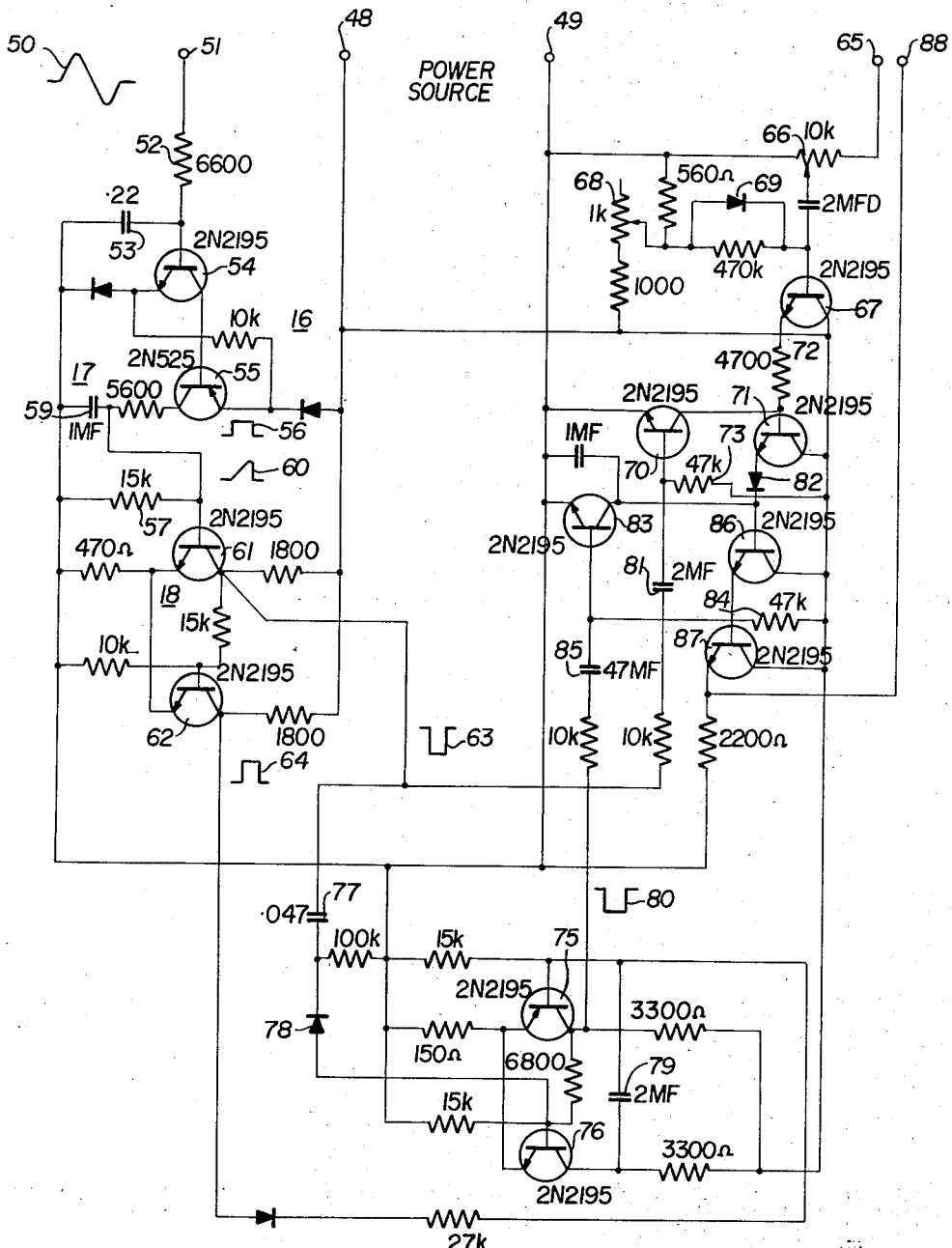
Figure 6:
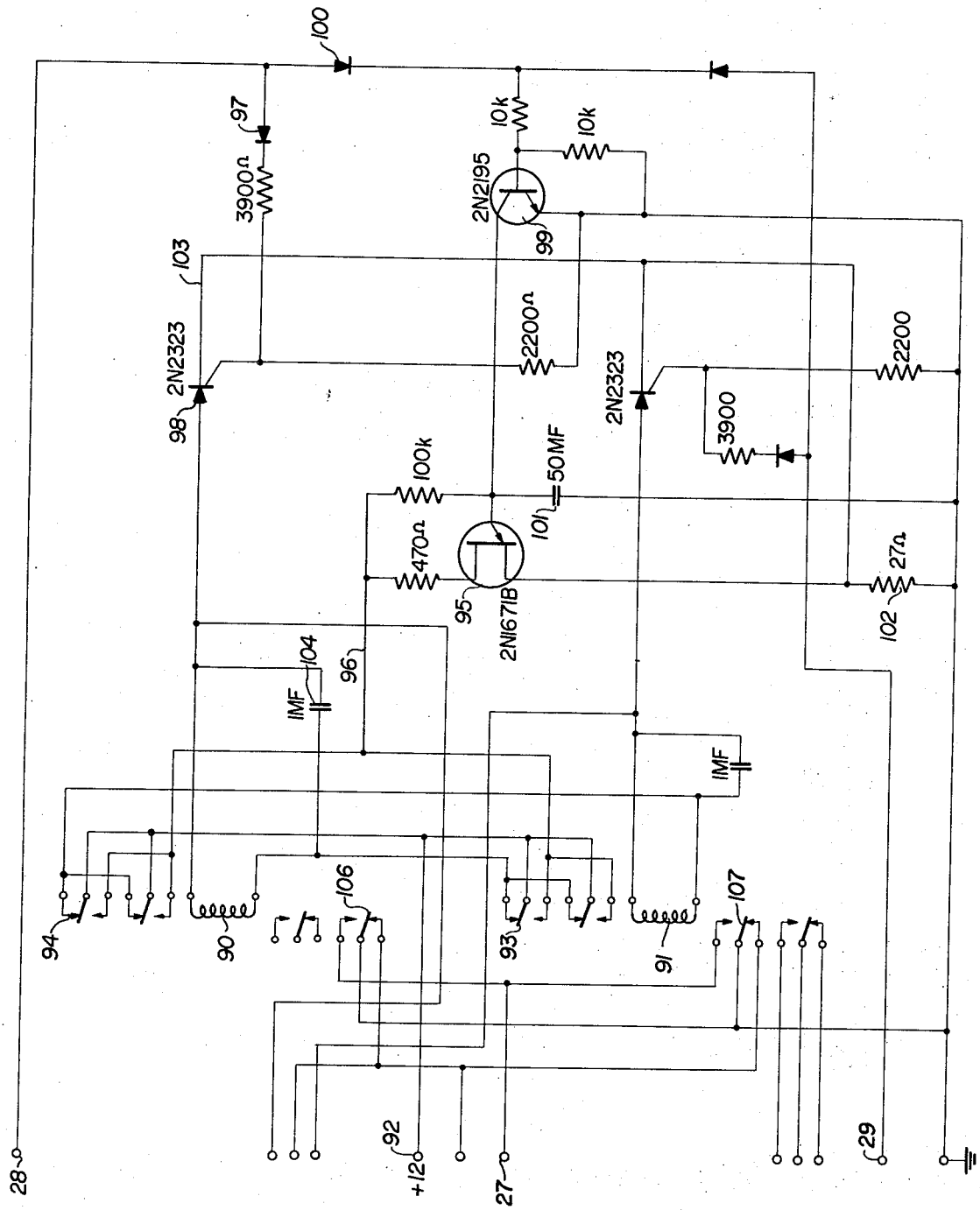
Figure 7:
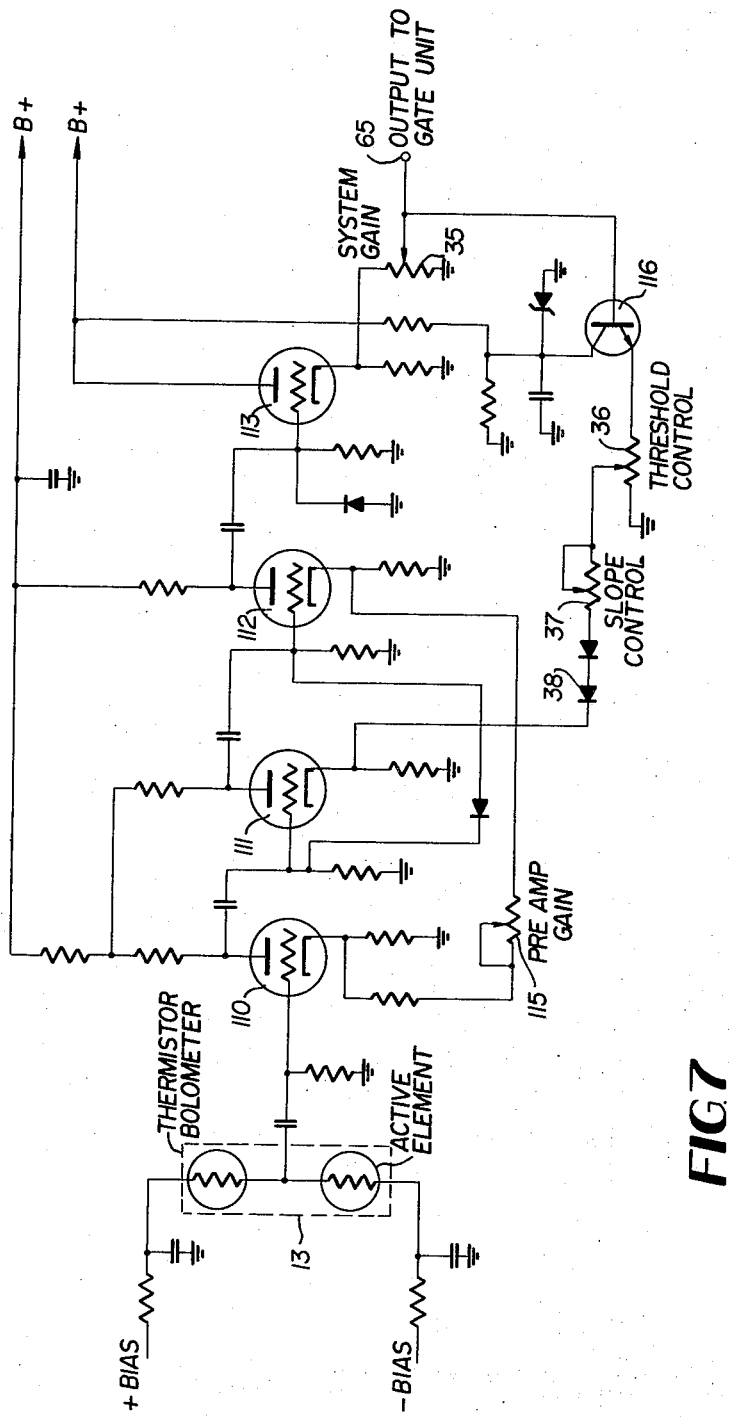

Further objects, features and advantages of the invention will be found throughout the following detailed description of a preferred embodiment of the invention, with reference to the accompanying drawing, wherein:

FIG. 1 is a block diagram of a hot box detection system as afforded by the invention, FIG. 2 is a graph illustrating operation of the system in detecting overheated bearings of different characteristics, FIGS. 3 and 4 are partial views of a railroad car axle, wheel, and bearing assembly utilizing respectively roller and friction type bearings, FIG. 5 is a schematic diagram of a transistorized gating circuit used to selectively activate the system for detecting temperature of a bearing on a moving train, FIG. 6 is a schematic diagram of a transistorized timer circuit used in the control system of the hot box detector system, and FIG. 7 is a schematic diagram of a non-linear amplifier circuit used in the hot box detector system to permit detection of overheated bearings of different types.

As may be seen from FIG. 1, a railway car moving along tracks 8 is represented by the broken away undertruck 9 containing wheel 10 and the bearing assembly 11 upon which an optical system 12 in the thermistor bolometer heat detector 13 is directed to look up from the ground and focus infra-red energy coming from a passing bearing upon the thermistor bolometer detector active element. The sensed thermal conditions of the bearing assembly 11 is amplified in operational amplifier 7, and is gated for a precisely determined time period by gate circuit 5 in response to signals produced when the wheel is over wheel detector 14 and the optical system is focused on a particular bearing assembly 11. This gating function tends to eliminate all noise signals and other thermal disturbances that might be detected by bolometer 13 if sparks, hot brake shoes, steam pipes, solar radiation, or heated bodies carried on the moving train enter the detection vicinity of the bolometer.

It is of particular importance that the look time or "gate on time" is shorter and more precisely controlled than possible with prior art systems. This is important since a longer gate time permits more chance for false overheating signals to occur, and furthermore introduces significant differences in operation depending upon the speeds of the passing trains. It is most important that the look time encompasses a fixed viewing distance at the time the bearing assembly 11 passes the thermal detector position which is independent of train speed.

This feature will be more particularly described hereinafter, as it relates to the operation of the various elements of the gating trigger circuits through which the gating signals are passes from wheel detector 14. Thus, the signals are processed through a squaring amplifier 16 and an integrator 17 before the trigger-hold circuit 18 provides gate signals on lead 19 and hold signals on lead 20. A readout oscillator 21 when actuated serves to read out signals stored in a pulse stretcher circuit 22 into a recorder 23, alarm 24 or telemetering carrier system 25.

The scanning head of the bolometer 13 has a protective shutter opened by means of signals on lead line 27 as the first wheels of an engine pass auxiliary wheel pickups 28 or 29 from either corresponding direction approaching the readout detector location 14. The timer circuit 6 is operated by the wheel detectors and may serve to turn off any snow heaters, to activate the recorder 23, alarm 24 and telemetering carrier system 25 along lead 30 or to perform other system functions.

In operation therefore the system is activated by the timer circuit 6 in response to an approaching train. Then, as each wheel passes in view of the scanner head of the thermal detector bolometer 13, infrared radiation is focused on the heat sensitive bolometer unit by the optical system 12 as taken from an image viewing field located to include bearing assembly 11 as it passes over wheel detector 14.

The infra-red signals detected at bolometer 13 are amplified at preamplifier 7 and fed to the input of the gate circuit. The overall preamplifier circuit which includes gain control potentiometer 35, threshold potentiometer 36, slope control potentiometer 37 and breakdown diode 38 operates with non-linear amplification characteristics as shown by the chart of FIG. 2 as a function of the temperature displayed on the abscissa. Thus signals from the preamplifier are attenuated to the desired level at the input of the gate circuit 5 by means of gain control 35 and provides also the input amplified signals selected for feedback at the threshold control 36. Thus signals exceeding a predetermined amplitude are selected by threshold control 36, such as about eighteen on the ordinate of FIG. 2, to change the slope of the gain characteristic at the point X from slope A to slope A'.

The slope control 37 will control the slope A' of the upper temperature range and the revised gain slope is effected by providing a degenerative signal portion passing breakdown (Zener) diode 38. Thus lower level signals are amplified with normal gain and higher level signals are amplified at reduced gain.

In operation this slope control feature is most important, since the roller bearing assembly as shown in FIG. 3 is viewed by the thermal detector at such an angle to other heat source signals and thus senses a position 40 which comprises the outer surface of the bearing which may run 75° to 100° F above ambient under normal conditions. On the other hand, the friction roller bearing assembly as viewed in FIG. 4 has an outer cast iron housing 41 about the bearing which is viewed at position 42, where the housing temperature sensed may run at only 20 to 25° above ambient under normal conditions. Thus assuming an ambient temperature of 60° F, it would be desirable to have a system range such that it would respond not only to overheated friction bearings that might cause a sensing temperature of around 100° F but also to an overheated roller bearing that might be sensed at about 200° F. Thus the slope A' together with the slope A gives an appropriate range of amplitudes within a span of performance encompassing both types of bearings that sensing can be handled readily with proper resolution in each case in the alarm sensing portion of the circuitry. Should the detectors be arranged differently to overcome the differences in temperatures of the two diverse types of bearings by scanning a partial view of the bearings or the truck side or back side of the journal box, such areas are slower to respond to thermal changes within the bearing and the possibilities of encompassing such heated bodies as steam pipes, missing an overheated bearing or misinterpreting a roller bearing for a hot friction bearing are increased. With the present amplifier construction all bearings may be read with approximately the same degree of resolution.

In order to attain further improved performance over prior art systems, the gating on time is controlled to accommodate very short and variable time periods which in essence permits a look at the bearings over the same span of movement for trains travelling over very wide speed ranges. Thus, the present detectors can be utilized without slowing down high speed trains. Furthermore the gating circuits attain a better signal-to-noise ratio by permitting shorter gating on periods than heretofore feasible.

Thus, as the wheel passes into the gating wheel pickup 14, signals are amplified and squared at circuit 16 and integrated at circuit 17. Only the first half or entry pulse derived from the wheel pickup is used for gating. The trigger circuit 18 serves as a threshold to set when signals of a proper amplitude are presented and open gate circuit 5 to pass the heat signals to pulse stretcher circuit 22. When the wheel passes the center of the pickup 14, the polarity of the signals changes and the squaring amplifier 16 is cut off, but the integrator circuit 17 holds these signals until they fall below the threshold level for the trigger circuit to reset it. The trigger circuit 18 serves as a threshold to set when signals of sufficient amplitude are presented. This opens gate circuit 5 to pass the heat signals to pulse stretcher 22. The leading edge of the signal also sets the read out oscillator 21 by lead 50 for a period of about 22 milliseconds to read out the signals stored from gate circuit 5 by pulse stretcher circuit 22. The hold circuit at lead 20 prevents the read out oscillator from being reset too soon with slow moving trains. By means of this system a uniform ten inch gate interval is maintained regardless of train speed.

The signals provided at recorder 23 and associated alarm 24 and telemetering carrier 25 are processed to determine whether an alarm is necessary as a result of observation of an overheated signal from either a roller or friction type bearing. The alarm circuit 24 may be of such a nature that it senses peak signals either of a magnitude such as that indicated in a range such as 43 on the graph of FIG. 2 or of a magnitude such as indicated in a range near 44. Such sensing instruments are well known in the art and thus need not be described herein in detail. However it may be observed that with the characteristics of the amplifier response as provided by this invention, a specific range of overheated friction bearings may be selected at 43 at which the detector system will respond which will not in any way interfere with the alternative range 44 which is selected for overheated roller bearings. Thus, both types of bearings can be detected with a single amplifier in this system without causing overlap of ranges or problems of amplifier resolution or magnitude range, and with each detection providing good sensitivity with an ability to select bearings only slightly overheated if desired without interference between readings for friction type or roller type bearings.

The gating circuit may be constructed as shown in FIG. 5, wherein the wheel detector circuit 14 of FIG. 1 provides a positive going pulse 50 at input terminal 51 which is slightly integrated by resistor 52 and capacitor 53. Transistors 54, 55 form a high gain squaring amplifier where transistor 55 is driven to saturation during the positive half of the pulse 50 to provide a square wave output pulse 56 at the collector which is connected by resistor 57 to power source terminal 49. Resistor 58 and capacitor 59 comprise an integrator circuit (17 in FIG. 1) which causes a saw-tooth pulse 60 to appear at the base of transistor 61.

Transistors 61 and 62 comprise a trigger circuit (18 in FIG. 1) in which transistor 62 normally conducts. When the threshold is reached by presentation of waveform 60, transistor 61 starts conducting with its collector going negative as shown at waveform 63 and transistor 62 switches off with its collector going positive as shown at waveform 64. This is set to occur with a leading edge as the wheel is about 5 inches before the center of gating transducer and with a trailing edge with the wheel about 5 inches past the center of the gating transducer to give approximately a 10 inch gate period. The electronic response times of the circuit accommodates trains of all speed ranges normally moving past the transducer.

For simplicity a pulse stretcher (22 in FIG. 1) and gate circuit (5 in FIG. 1) is shown for only a single rail, but a duplicate circuit can be used for the second rail. Preamplified signals from trackside enter terminal 65 and are controlled in amplitude by potentiometer 66 before reaching the base of transistor 67. The cold comparison voltage is applied through potentiometer 68 and diode 69. Emitter signals are coupled to transistors 70 and 71 through resistor 72. Transistor 70 is normally biased on through resistor 73, all signals are shunted to terminal 49 (ground). This is the gate off condition.

Transistors 75 and 76 form a monostable circuit with transistor 76 normally conducting and transistor 75 normally off. When a wheel passes, waveform 63 coupled through capacitor 77 and diode 78 causes transistor 76 to turn off. In turn the signal at capacitor 79 causes transistor 75 to conduct. This gives a negative output pulse 80 of about 22 milliseconds.

The wheel pulse 63 also is coupled to transistor 70 through capacitor 81 to allow signals from the pre-amp to pass through transistor 71 and diode 82. Transistor 83 is normally biased on through resistor 84. The timed negative pulse 80 then is passed by capacitor 85 to provide signals through transistors 86, 87 appearing for output at lead 88 until the wheel passes causing the trailing edge of pulse 63 to shunt signals to ground at transistor 70. As soon as the 22 milliseconds of pulse 80 expire and the monostable circuit 75—76 is reset, a further pulse may be read out.

The timer circuit 6 of FIG. 1 may be constructed as shown in FIG. 6. The purpose of this circuit is to activate the circuits only when a train is passing by means of transducers 28 and 29 and to indicate the direction of movement of the train. Relays 90 and 91 provide the switching signals for these purposes, when either one is operated, as identified by corresponding reference characters to similar portions of FIG. 1.

Battery voltage at terminal 92 can operate only one relay at a time through connection via contact sets 93 and 94 to corresponding relay solenoids 90 and 91. Whenever either relay is energized the normally open contacts of sets 93, 94 operate the time-out oscillator comprising unijunction transistor 95 by way of lead 96.

Signals from transducer 28 appear at diode 97 to fire SCR 98 and activate solenoid 90. Also transistor 99 receives the signals via diode 100, and each pulse causes this transistor to conduct and discharge capacitor 101. After the last train wheel pulse is received this capacitor partly charges in about 8 seconds to fire transistor 95 discharging capacitor 101 through resistor 102 to provide a turn-off pulse for SCR 98 at lead 103 because of the action of capacitor 104 in the anode circuit. This resets the timer.

The circuit operates similarly to actuate solenoid 91 if pulses are first received through wheel senser transducer 29. Signals from contact sets 106 and 107 can provide at lead 27 a circuit connection for operating the bolometer shutter of FIG. 1 for example, and the other functions of operating the recorder, etc., can be carried out through other connections on the relay contacts as desired.

The construction of the preamplifier circuit 7 of FIG. 1 may be as shown in FIG. 7, where the thermister bolometer 13 is shown providing signals at the grid of amplifier tube 110. The tubes 110, 111, 112 and 113 are essentially cascade connected as an operational amplifier with degenerative feedback control 115 afforded to set pre-amp gain.

As previously described this amplifier has a threshold control circuit 36, which in this circuit configuration comprises the emitter follower resistor of transistor 116 feeding back output signals at terminal 65 degeneratively only when zener diodes 38 break down. In this manner the gain characteristic of FIG. 2 is achieved so that gains adjusted for an ample degree of resolution on the steep initial gain characteristic for the lower temperature reading of friction bearings, and the hotter roller bearing readings on the shallow further gain characteristic will not be of such magnitude as to saturate the system. This is achieved while maintaining the amplitude of friction bearing readings high enough for proper evaluation.

What is claimed is:

1. In a trackside hot box detector system for detecting heated bearings on a moving train, a heat detector directed to sense by looking upward from the ground on the outside of a wheel only the journal portion of the bearings on passing axles which in the case of friction bearings is the housing box and which in the case of roller bearings is the bearing assembly and to provide therefrom electrical signals, amplifying means coupled to said heat detector to process the electrical signals therefrom to produce output signals representing temperatures in a range including both overheated friction bearings and overheated roller bearings comprising a non-linear amplifier having a steep initial gain characteristic for lower temperatures of overheated friction bearings and a shallow further gain characteristic for higher temperatures of overheated roller bearings, and alarm means coupled to said amplifier operable in response to detected temperatures in two separated bands respectively for indicating overheating of said friction and roller bearings.

2. A system as defined in claim 1 wherein the non-linear amplifier comprises an operational amplifier circuit having a degenerative feedback loop with a breakdown diode therein.

3. A system as defined in claim 2 provided with a threshold control and a slope control in said feedback loop.

4. A system as defined in claim 1 including a wheel detector and a gating circuit adjusted for processing signals received from said wheel detector over approximately 10 inches of wheel travel in the vicinity of said wheel detector.

5. A system as defined in claim 4 including a circuit wherein the signals processed from said amplifier are squared and integrated, said gating circuit comprises a threshold operated trigger circuit responsive to the integrated signals, and including timing means storing signals read out by said gating circuit for a period of approximately 22 milliseconds.

6. A system as defined in claim 1 including means sensing the direction of the train.

7. A system as defined in claim 6 including a circuit processing a pulse for each passing train wheel and a storage capacitor receiving said pulses having a time constant circuit providing a time constant longer than the predetermined time between two successive wheels.

* * * * *